United States Patent [19]
Takahashi

[11] Patent Number: 5,774,268
[45] Date of Patent: Jun. 30, 1998

[54] HEAD- OR FACE-MOUNTED IMAGE DISPLAY APPARATUS

[75] Inventor: Junko Takahashi, Atsugi, Japan

[73] Assignee: Olympus Optical Co., Ltd., Tokyo, Japan

[21] Appl. No.: 733,647

[22] Filed: Oct. 17, 1996

[30] Foreign Application Priority Data

Oct. 17, 1995 [JP] Japan .................................. 7-268485

[51] Int. Cl.$^6$ .................................................. G02B 27/14
[52] U.S. Cl. .......................... 359/630; 359/631; 359/632; 359/633
[58] Field of Search ..................................... 359/630–633

[56] References Cited

U.S. PATENT DOCUMENTS 5,539,578  7/1996  Togino et al. ........................... 359/630

FOREIGN PATENT DOCUMENTS 6-308424  11/1994  Japan .
7-43634   2/1995   Japan .
7-56111   3/1995   Japan .

Primary Examiner—Georgia Y. Epps
Assistant Examiner—Evelyn A. Lester
Attorney, Agent, or Firm—Cushman Darby & Cushman IP Group of Pillsbury Madison & Sutro LLP

[57] ABSTRACT

A compact, wide-field, high-resolution, low-cost and easy-to-handle head- or face-mounted image display apparatus in which unwanted light is reduced without using a polarizing member or a louver optical system. The apparatus has an image display device (1) for displaying an image; an optical system (P) for projecting the image into an observer's eyeball as an enlarged image without effecting image formation on the way to the observer's eyeball; and a device for mounting and retaining the image display device (1) and the optical system (P) on an observer's head or face i The optical system (P) is a prism optical system which has at least four surfaces, that is, a back-coated mirror (3) of positive power which is disposed to face the image display device (1), an image display device-side surface (2) facing opposite to the back-coated mirror (3), an exit surface (5) closer to the observer's eyeball, and a transmitting surface (7) facing opposite to the exit surface (5), and which is made of a transparent medium having a refractive index larger than 1. The distance between the vertex of the back-coated mirror (3) and the vertex of the image display device-side surface (2) satisfies the condition of $0.8 \leq \theta_{min}/\theta_{max} \leq 1.5$.

25 Claims, 12 Drawing Sheets

FIG. 3
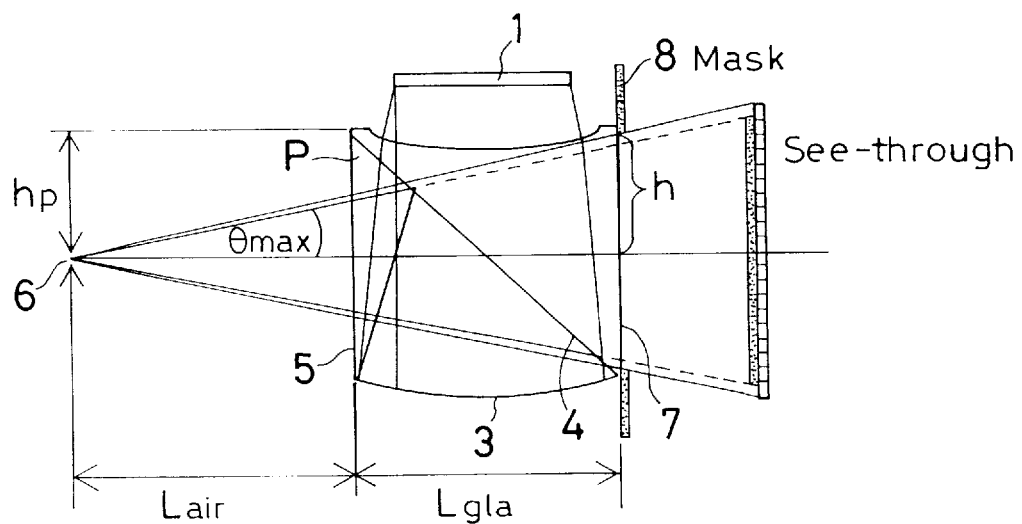
FIG. 4(a)   FIG. 4(b)   FIG. 4(c)
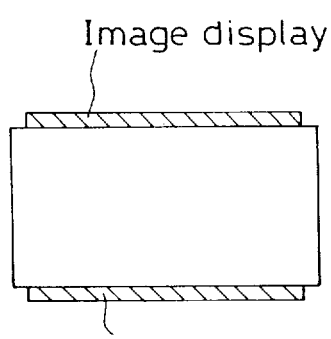
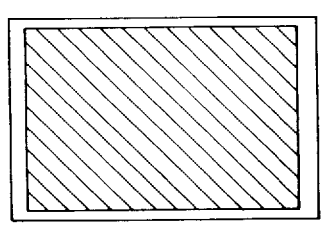
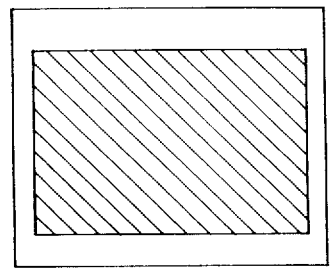
Image display range
See-through image range

HEAD- OR FACE-MOUNTED IMAGE DISPLAY APPARATUS

BACKGROUND OF THE INVENTION

The present invention relates to a head- or face-mounted image display apparatus and, more particularly, to a compact and lightweight head- or face-mounted image display apparatus which can be mounted on a user's head or face to project an image into a user's eyeball.

In recent years, helmet- and goggle-type head- or face-mounted image display apparatuses have been developed for virtual reality or for the purpose of enabling the user to personally enjoy wide-screen images of enhanced dynamic presence.

There has been proposed a head- or face-mounted display apparatus having a see-through function in which, as shown in FIG. 1, light rays from an image display device 1 enter a prism optical system P through an image display device-side surface 2 and are reflected by a back-coated mirror 3, and the reflected light rays are reflected by a semitransparent film 4 and pass through a pupil-side surface 5 of the prism optical system P to enter an observer's pupil 6. In this optical system, light rays shown by the thick lines enter the pupil 6 as normal light rays to give an image to the observer. The optical system suffers, however, from the problem that there is unwanted light from the image display device 1 as shown by the dotted line, and when the seethrough function is used, there is also unwanted light as shown by the chain line.

To solve the above-described problem, Japanese Patent Application Unexamined Publication (KOKAI) No. 7-43634 proposes an optical system that uses a polarizing plate and a quarter-wave plate. However, this optical system reduces not only unwanted light during the use of the see-through function but also normal image light rays from the seethrough image field and the image display device, causing the visibility of the image for observation to be degraded. This causes the observer to be fatigued. Moreover, the use of a polarizing plate and a quarter-wave plate causes the cost to increase.

Japanese Patent Application Unexamined Publication (KOKAI) No. 7-56111 proposes a technique of coping with the problem of unwanted light from the image display device. According to this technique, the numerical aperture of light rays from the image display device is reduced by using a louver or other similar device, thereby preventing unwanted light from the image display device from entering the observer's pupil. In this case, however, when the observer views the image field, the lines of the louver are undesirably seen in the image field. Further, the use of a numerical aperture-reducing device such as a louver causes the cost to increase.

To correct distortion, Japanese Patent Application Unexamined Publication (KOKAI) No. 6-308424 proposes a method which enables the distortion to be reduced to about 5% while providing a wide field angle of 30° or more by using an aspherical surface. However, in order to provide an image of enhanced dynamic presence to the observer, it is essential not only to reduce the distortion to about 5% despite a wide field angle of 30° or more but also to correct astigmatism satisfactorily despite a small tilt angle of principal rays from the image display device.

SUMMARY OF THE INVENTION

In view of the above-described circumstances of the conventional techniques, an object of the present invention is to provide a head- or face-mounted image display apparatus which has a wide field angle, high resolution, minimal distortion and astigmatism as well as a small principal ray tilt angle and which is easy to handle, inexpensive and compact by reducing unwanted light during the use of see-through function without using a polarizing member or a louver optical system, reducing the proportion in which the unwanted light is superimposed on a virtual image of the image display device, and also reducing unwanted light from the image display device.

To attain the above-described object, the present invention provides a head- or face-mounted image display apparatus having an image display device for displaying an image; an optical system for projecting the image into an observer's eyeball as an enlarged image without effecting image formation on the way to the observer's eyeball; and a device for mounting and retaining the image display device and the optical system on an observer's head or face. The optical system is a prism optical system having at least four surfaces, that is, a back-coated mirror of positive power which is disposed to face the image display device, an image display device-side surface facing opposite to the back-coated mirror, an exit surface closer to the observer's eyeball, and a transmitting surface facing opposite to the exit surface. The prism optical system is made of a transparent medium having a refractive index larger than 1. The distance between the vertex of the back-coated mirror and the vertex of the image display device-side surface satisfies the following condition:

$$0.8 \leq \theta_{min}/\theta_{max} \leq 1.5 \tag{1}$$

where $\theta_{min}$ is the smallest of angles formed between the central axis of a virtual image field and light rays extending from an arbitrary point in an exit pupil of the optical system and touching the image display device-side surface, and $\theta_{max}$ is an angle formed between the central axis of the virtual image field and a light ray extending from the central point in the exit pupil of the optical system to the upper edge of the virtual image field.

According to a second aspect of the present invention, there is provided a head- or face-mounted image display apparatus having an image display device for displaying an image; an optical system for projecting the image into an observer's eyeball as an enlarged image without effecting image formation on the way to the observer's eyeball; and a device for mounting and retaining the image display device and the optical system on an observer's head or face. The optical system is a prism optical system having at least four surfaces, that is, a back-coated mirror of positive power which is disposed to face the image display device, an image display device-side surface facing opposite to the back-coated mirror, an exit surface closer to the observer's eyeball, and a transmitting surface facing opposite to the exit surface. The prism optical system is made of a transparent medium having a refractive index larger than 1. The head- or face-mounted image display apparatus further has a visual field control device for limiting the visual field at the transmitting surface, which faces opposite to the exit surface. The visual field control device has a size that satisfies the following condition:

$$h_p \geq h \geq 0.8 \times (L_{air} \tan\theta_{max} + L_{gla} \tan\theta_{max}/n) \tag{4}$$

where h is the size of the visual field control device; $h_p$ is the distance from the central axis of the virtual image field to the end surface (the image display device-side surface) of the prism optical system, $L_{air}$ is the distance from the exit pupil of the optical system to the exit surface; $L_{gla}$ is the distance from the exit surface to the transmitting surface; n is the refractive index of the transparent medium; and $\theta_{max}$ is an angle formed between the central axis of the virtual image field and a light ray extending from the central point in the exit pupil of the optical system to the upper edge of the virtual image field.

According to a third aspect of the present invention, there is provided a head- or face-mounted image display apparatus having an image display device for displaying an image; an illuminating device for illuminating the image display device; an optical system for projecting the image into an observer's eyeball as an enlarged image without effecting image formation on the way to the observer's eyeball; and a device for mounting and retaining the image display device, the illuminating device and the optical system on an observer's head or face. The optical system is a prism optical system having at least four surfaces, that is, a back-coated mirror of positive power which is disposed to face the image display device, an image display device-side surface facing opposite to the back-coated mirror, an exit surface closer to the observer's eyeball, and a transmitting surface facing opposite to the exit surface. The prism optical system is made of a transparent medium having a refractive index larger than 1. The distance between the illuminating device and the image display device satisfies the following condition:

$$Sb > d > 1 \text{ millimeter} \quad (7)$$

where d is the distance between the illuminating device and the image display device, and Sb is the size of the illuminating device.

According to a fourth aspect of the present invention, there is provided a head- or face-mounted image display apparatus having an image display device for displaying an image; an optical system for projecting the image into an observer's eyeball as an enlarged image without effecting image formation on the way to the observer's eyeball; and a device for mounting and retaining the image display device and the optical system on an observer's head or face. The optical system is a prism optical system having at least four surfaces, that is, a back-coated mirror of positive power which is disposed to face the image display device, an image display device-side surface facing opposite to the back-coated mirror, an exit surface closer to the observer's eyeball, and a transmitting surface facing opposite to the exit surface. The prism optical system is made of a transparent medium having a refractive index larger than 1. The image display device-side surface of the optical system is a curved surface. The curved surface is tilted such that the tilt angle $\alpha$ of the surface at a point where the outermost extra-axial principal ray passes satisfies the following condition:

$$10° \leq \alpha \leq 30° \quad (19)$$

According to a fifth aspect of the present invention, there is provided a head- or face-mounted image display apparatus having an image display device for displaying an image; an optical system for projecting the image into an observer's eyeball as an enlarged image without effecting image formation on the way to the observer's eyeball; and a device for mounting and retaining the image display device and the optical system on an observer's head or face. The optical system is a prism optical system having at least three surfaces, that is, a back-coated mirror of positive power which is disposed to face the image display device, an image display device-side surface facing opposite to the back-coated mirror, and an exit surface closer to the observer's eyeball. The prism optical system is made of a transparent medium having a refractive index larger than 1. The image display device-side surface and the image display device are bonded together such that an optical axis of the optical system and an optical axis of the image display device are aligned with each other.

The reasons for adopting the above-described arrangements, together with the functions thereof, will be explained below.

Let us consider a case where an external scene is observed, in addition to a virtual image of an image displayed on an image display device, by using the see-through function. FIG. 1 shows a head- or face-mounted image display apparatus using a prism optical system P. Light rays from an image display device 1 enter a prism optical system P through an image display device-side surface 2 and are reflected by a back-coated mirror 3, and the reflected light rays are reflected by a semitransparent film 4 and pass through a pupil-side exit surface 5 of the prism optical system P to enter an observer's pupil 6. Normal see-through light rays enter the prism optical system P through a transmitting surface 7 facing opposite to the observer's eyeball-side exit surface 5 and pass through the exit surface 5 to enter the observer's eyeball. In this case, ghost light from a see-through image, which is shown by the chain line, enters the prism optical system P through the transmitting surface 7, which faces opposite to the observer's eyeball-side exit surface 5. Thereafter, the ghost light is totally reflected by the image display device-side surface 2 to enter the observer's eyeball 6 through the exit surface 5, forming a ghost image. The ghost light is light rays entering the observer's eyeball 6 at an angle of $\theta_{min}$ or more. Light rays from the image display area of the image display device 1 are also reflected by the semitransparent film 4 to enter the observer's pupil 6 through the pupil-side exit surface 5, thereby being observed. The observation field angle $\theta_{max}$ formed between the central axis of the virtual image of the image display device 1 (i.e. the display area image) and the upper edge of the virtual image field is a value determined by the power of the optical system.

Under these circumstances, if the see-through image and the projected image of the display area of the image display device 1 are simultaneously observed by using the see-through function, the ghost image of the see-through image is undesirably superimposed on the display area image, making it difficult for the observer to view either of the images.

The undesired superimposition is minimized if the ratio of the minimum field angle $\theta_{min}$, at which light from the see-through image becomes unwanted light, to the field angle of the display area image $\theta_{max}$ satisfies the following condition:

$$0.8 \leq \theta_{min}/\theta_{max} \leq 1.5 \quad (1)$$

Consequently, the display area image becomes easy to observe as will be understood from FIG. 2(a), which shows the relationship between the see-through ghost range and the image display range.

It is even more desirable that the distance between the vertex of the back-coated mirror 3 and the vertex of the image display device-side surface 2 should satisfy the following condition:

$$1.0 \leq \theta_{min}/\theta_{max} \leq 1.5 \quad (2)$$

If the condition (2) is satisfied, unwanted light from the see-through image is not superimposed on the display area image, as shown in FIG. 2(b). Accordingly, the display area image becomes easier to observe.

It is even more desirable that the distance between the vertex of the back-coated mirror 3 and the vertex of the image display device-side surface 2 should satisfy the following condition:

$$1.2 \leq \theta_{min}/\theta_{max} \leq 1.5 \quad (3)$$

If the condition (3) is satisfied, the display area image and unwanted light from the see-through image are observed apart from each other, as shown in FIG. 2(c). Therefore, the display area image becomes extremely easy to observe. Thus, a favorable visibility is attained.

In the head- or face-mounted image display apparatus according to the second aspect of the present invention, it is preferable that, as shown in FIG. 3, the size h of a mask 8, which is a visual field limiting device, should satisfy the following condition:

$$h_p \geq h \geq 0.8 \times (L_{air} \tan\theta_{max} + L_{gla} \tan\theta_{max}/n) \quad (4)$$

If the condition (4) is satisfied, the field angle of the see-through image field is at least 0.8 times the field angle of the display area image. If the field angle of the see-through image field is at least 0.8 times the field angle of the display area image, when the see-through image field and the display area image are simultaneously observed, as shown in FIG. 4(a), the see-through image field is smaller than the display area image. Accordingly, observation can be effected without the see-through image field extending off the display area image. This arrangement is preferably employed to provide the observer with an image centered on the display area image. If the arrangement is used where ghost may arise from the see-through image, no ghost image is superimposed on the display area image.

It is also preferable to satisfy the following condition:

$$h_p \geq h \geq 1.0 \times (L_{air} \tan\theta_{max} + L_{gla} \tan\theta_{max}/n) \quad (5)$$

If the condition (5) is satisfied, as shown in FIG. 4(b), the see-through image field can be observed with a field angle (image field) which is the same as or larger than that of the display area image. In this case, the display area image and the see-through image become approximately equal in size to each other. Therefore, when a see-through image of the external scene and the display area image are combined together, it is possible to provide an even more natural composite image without incongruity. In a case where ghost may arise from the see-through image field, superimposition of the ghost image on the display area image is minimized, and the observation of the ghost image is favorably reduced.

It is also preferable to satisfy the following condition:

$$h_p \geq h \geq 1.4 \times (L_{air} \tan\theta_{max} + L_{gla} \tan\theta_{max}/n) \quad (6)$$

If the condition (6) is satisfied, as shown in FIG. 4(c), the see-through image field can be observed with a field angle (image field) which is at least 1.4 times that of the display area image. Accordingly, not only information on the display area but also information on the see-through image field becomes extremely easy to view. This arrangement is particularly preferably employed where the observer is provided with an image centered on a see-through image of an external scene.

In the head- or face-mounted image display apparatus according to the third aspect of the present invention, it is preferable that, as shown in FIGS. 5(a) to 5(c), the distance between an illuminating device 9 and a display surface of an image display device 1 should satisfy the following condition:

$$Sb > d > 1 \text{ millimeter} \quad (7)$$

Assuming that the focal length of the ocular optical system is 30 millimeters, for example, and the diameter of the iris of the observer's eyeball, that is, the exit pupil diameter of the ocular optical system, is 8 millimeters, and that the ocular optical system is telecentric on the image display device side, the angle of necessary light rays, which enter the observer's pupil, is 7.6° according to a general formula for numerical aperture. In other words, among light rays emitted from the image display device, those which are at 10° or more with respect to the normal to the image display device have no effect on the image for observation and; rather, they are unwanted light rays and may cause flare or ghost. A scheme for preventing the occurrence of unwanted light will be explained below.

As shown in FIGS. 5(a) to 5(c), the distance between the display surface of the image display device 1 and the illuminating device 9 is defined as d, and the angle between the normal to the image display device 1 and an imaginary straight line connecting an end point on the light-emitting surface of the illuminating device 9 and the corresponding end point on the display surface is defined as θ. As the illuminating device 9 is moved away from the image display device 1 such that the distance d changes to be $d_0 < d_1$ [FIG. 5(a)→FIG. 5(b)], the incident angle θ of light rays from the illuminating device 9 at the edge of the image display area changes to be $\theta_0 > \theta_1$. That is, as the distance d between the display surface of the image display device 1 and the illuminating device 9 increases ($d_1 \rightarrow d_2 \rightarrow d_3$), the incident angle θ of light rays from the illuminating device 9 at the edge of the image display area decreases ($\theta_1 \rightarrow \theta_2 \theta_3$). By setting the distance d at 1 millimeter or more, the incident angle of light rays from the illuminating device 9 at the edge of the image display area becomes satisfactorily small, as shown in FIG. 5(a). Thus, it is possible to reduce unwanted light.

It will be apparent that the above-described purpose can be attained by combining conditions (8) to (18) described later. Suitable numerical values vary according to the field angle of the optical system, the size of the image display device, the image to be observed, the observer's personal point of view, and so forth. In the present invention, unwanted light is successfully cut off without sticking to numerical values and without using a special optical element.

It is also preferable that the distance between the illuminating device and the display surface should satisfy the following condition:

$$Sb > d > 2 \text{ millimeters} \quad (8)$$

If the distance between the display surface of the image display device 1 and the illuminating device 9 is 2 millimeters or more, as shown in FIG. 5(b), the incident angle of light rays from the illuminating device 9 at the edge of the image display area becomes smaller, and unwanted light can be further reduced.

It is even more desirable to satisfy the following condition:

$$Sb > d > 3 \text{ millimeters} \quad (9)$$

If the distance between the illuminating device 9 and the display surface is 3 millimeters or more, as shown in FIG. 5(c), the incident angle of light rays from the illuminating device 9 at the edge of the image display area becomes further smaller, and unwanted light can be reduced even more effectively. However, because the intensity of light from the illuminating device 9 reduces, an optimum value should be determined.

As shown in FIGS. 6(a), 6(b), 8(a) and 8(b), it is desirable to tilt the illuminating device 9 and the image display device 1 relative to each other. In particular, it is desirable to tilt the illuminating device 9 and the image display device 1 relative to each other such that the illuminating device 9 and the image display device 1 diverge from each other at ends thereof which are remote from the observer's eyeball [see FIGS. 6(a) and 6(b)], and that the distance between their diverging ends satisfies the following condition:

$$Sb > ds > 1 \text{ millimeter} \tag{10}$$

where ds is the distance between the illuminating device 9 and the image display device 1 at their ends remote from the observer's eyeball, and Sb is the size of the illuminating device 9.

When the distance between the illuminating device 9 and the image display device 1 is set at ds1 (ds1<ds2) [see FIGS. 6(a) and 6(b)], the incident angle of light rays from the illuminating device 9 at the edge of the image display area is θes1 (θs1>θs2). That is, as the distance between the illuminating device 9 and the image display device 1 increases [FIG. 6(a)→FIG. 6(b)], the incident angle θ of light rays from the illuminating device 9 at the edge of the image display area reduces (θs1→θs2). By tilting the illuminating device 9 and the image display device 1 relative to each other such that the illuminating device 9 and the image display device 1 diverge from each other at ends thereof which are remote from the observer's eyeball, and that the distance between their diverging ends satisfies the condition of Sb>ds>1 millimeter, the tilt angle of light rays emanating from the edge of the image display area is reduced, as shown in FIG. 6(b). By way of example, unwanted light traveling along a path such as that shown in FIG. 7 can be reduced.

It is more desirable to satisfy the following condition:

$$Sb > ds > 2 \text{ millimeters} \tag{11}$$

By tilting the illuminating device 9 and the image display device 1 relative to each other such that the distance between their diverging ends is 2 millimeters or more, the tilt angle of light rays emanating from the edge of the image display area is further reduced, and unwanted light can be further reduced.

It is still more desirable to satisfy the following condition:

$$Sb > ds > 3 \text{ millimeters} \tag{12}$$

By tilting the illuminating device 9 and the image display device 1 relative to each other such that the distance between their diverging ends is 3 millimeters or more, the tilt angle of light rays emanating from the edge of the image display area is still further reduced, and unwanted light can be reduced very effectively.

As shown in FIGS. 8(a) and 8(b), the illuminating device 9 and the image display device 1 may be tilted relative to each other such that the illuminating device 9 and the image display device 1 diverge from each other at ends thereof closer to the observer's eyeball. In this case, the illuminating device 9 and the image display device 1 are desirably tilted relative to each other such that the distance between their ends closer to the observer's eyeball satisfies the following condition:

$$Sb > dh > 1 \text{ millimeter} \tag{13}$$

where dh is the distance between the illuminating device 9 and the image display device 1 at their ends closer to the observer's eyeball, and Sb is the size of the illuminating device 9.

When the distance between the illuminating device 9 and the image display device 1 is set at dh1 (dh1<dh2) [see FIGS. 8(a) and 8(b)], the incident angle of light rays from the illuminating device 9 at the edge of the image display area is θh1 (θh1>θh2). In other words, as the distance between the illuminating device 9 and the image display device 1 increases [FIG. 8(a)→FIG. 8(b)], the incident angle θ of light rays from the illuminating device 9 at the edge of the image display area decreases (θh1→θh2). By tilting the illuminating device 9 and the image display device 1 relative to each other such that the illuminating device 9 and the image display device 1 diverge from each other at ends thereof closer to the observer's eyeball, and that the distance between their diverging ends satisfies the condition of Sb>dh>1 millimeter, the tilt angle of light rays emanating from the edge of the image display area is reduced, as shown in FIG. 8(b). By way of example, unwanted light traveling along a path such as that shown in FIG. 9 can be reduced.

It is more desirable to satisfy the following condition:

$$Sb > dh > 2 \text{ millimeters} \tag{14}$$

By tilting the illuminating device 9 and the image display device 1 relative to each other such that the illuminating device 9 and the image display device 1 diverge from each other at ends thereof closer to the observer's eyeball, and that the distance between their diverging ends is 2 millimeters or more, the tilt angle of light rays emanating from the edge of the image display area is further reduced, and unwanted light can be further reduced.

It is still more desirable to satisfy the following condition:

$$Sb > dh > 3 \text{ millimeters} \tag{15}$$

By tilting the illuminating device 9 and the image display device 1 relative to each other such that the distance between their diverging ends is 3 millimeters or more, the tilt angle of light rays emanating from the edge of the image display area is still further reduced, and unwanted light can be reduced very effectively.

Further, the illuminating device 9 desirably has a size that satisfies the following condition relative to the image display device 1:

$$Sb \leq 1.1 \times SL \tag{16}$$

where Sb is the size of the illuminating device 9, and SL is the image display size of the image display device 1.

If the size of the illuminating device 9 is not more than 1.1 times the image display size of the image display device 1, unwanted light entering the pupil reduces. FIG. 10(a) shows a case where $Sb \leq 1.3 \times SL$. FIG. 10(b) shows a case where $Sb \leq 1.1 \times SL$. In these cases, θb1>θb2. Therefore, setting the size of the illuminating device 9 to be not more than 1.1 times the image display size of the image display device 1 is an effective measure to minimize unwanted light entering the pupil as shown in FIGS. 7 and 9.

Further, it is desirable for the size of the illuminating device 9 to satisfy the following condition:

$$0.8 \times SL \leq Sb \leq 1.1 \times SL \tag{17}$$

If the size of the illuminating device 9 is in the range of from 0.8 to 1.1 times the image display size of the image display device 1, unwanted light entering the pupil further reduces. However, as the size of the illuminating device 9 is reduced, the amount of light eclipsed increases in the vertical direction, although the eclipse in the horizontal direction is not so remarkable as it is in the vertical direction.

Therefore, to reduce unwanted light, it is important to find a suitable value for the illuminating device size in the range of from 0.9 to 1.0 time the image display size.

To reduce the size of the illuminating device 9, an aperture limiting device such as a mask 10 shown in FIG. 10(c) may be used. In place of such an aperture limiting device, as shown in FIG. 10(d), an optical wedge 11 (θb>θa) may be disposed between the illuminating device 9 and the image display device 1. It is also possible to dispose, as shown in FIG. 10(e), an optical system 12 (θc2>θc1, θd2>θd1) of negative power or a device equivalent in function to the optical wedge 11 or the optical system 12.

In the head- or face-mounted image display apparatus according to the fourth aspect of the present invention, the image display device-side surface of the prism optical system is a curved surface, and the curved surface is tilted such that the tilt angle α of the surface at a point where the outermost extra-axial principal ray passes satisfies the following condition:

$$10° \leq \alpha \leq 30° \tag{19}$$

It should be noted that the outermost extra-axial principal ray is a ray emitted from the maximum point on the diagonal of the image display device 1.

The concave surface of the ocular optical system produces curvature of field and image distortion. The image display device-side surface of the ocular optical system produces astigmatism. The above expression (19) is a condition for favorably correcting these aberrations with good balance.

More specifically, to minimize minus distortion produced by the curvature of the back-coated mirror 3, light rays from the image display device 1 should be corrected when passing through the image display device-side surface 2. This is because at the surface 2 the distortion can be corrected with less aggravation of other aberrations such as comatic aberration than at another surface. Assuming that the tilt angle of the outermost extra-axial principal ray from the image display device 1 relative to the optical axis when the ray has passed through the image display device-side surface 2 is α, when α is large, distortion is small, but astigmatism becomes large because of a large difference in curvature between the meridional plane and the sagittal plane at the image display device-side surface 2. Conversely, when α is small, minus distortion produced by the curvature of the back-coated mirror 3 is large, but astigmatism is small. The above expression (19) is a condition for obtaining good balance between the two aberrations.

If α exceeds the upper limit of the condition (19), i.e. 30°, astigmatism becomes excessively large and hence impossible to correct by another surface. If α is less than the lower limit, i.e. 10°, image distortion becomes excessively large and hence impossible to correct by another surface.

Further, it is desirable for the tilt angle α to satisfy the following condition:

$$15° \leq \alpha \leq 25° \tag{20}$$

If the condition of $15° \leq \alpha \leq 25°$ is satisfied, astigmatism and distortion can be favorably with better balance, and it is possible to obtain a nondistorted clear observation image at a wide observation field angle.

It is preferable that the coating of the reflecting surface of the back-coated mirror 3 should be aluminum coating. Aluminum coating enables the reflecting surface to be coated at extremely low cost. The reflecting surface may be coated with silver in place of the aluminum coating. In this case, extremely high reflectivity can be obtained; therefore, the reduction in the light quantity is minimized. Accordingly, silver is suitable for coating of the reflecting surface. Further, the reflecting surface may be coated with a dielectric multilayer film in place of the aluminum coating. The dielectric multilayer film has high reflectivity and is therefore suitable for coating of the reflecting surface.

Moreover, the image display device-side surface 2 and the display surface of the image display device 1 may be parallel to each other. If the image display device-side surface 2 and the display surface of the image display device 1 are parallel to each other, when the image display device 1 and the prism optical system P are assembled together, the image display device 1 can be positioned with respect to the image display device-side surface 2 by using the latter as the reference. Accordingly, the assembling operation is facilitated. Further, assembling errors reduce, and the apparatus becomes easy to handle.

In the head- or face-mounted image display apparatus according to the fifth aspect of the present invention, the image display device-side surface 2 and the image display device 1 are bonded together such that the optical axis of the prism optical system P and the optical axis of the image display device 1 are aligned with each other. If the image display device-side surface 2 and the image display device 1 are bonded as described above, the assembling operation is further facilitated, and the apparatus becomes easier to handle.

In this case, it is desirable for the image display device-side surface 2 to have a positioning member for the image display device 1. When the image display device-side surface 2 and the display surface of the image display device 1 are to be bonded together, if the image display device-side surface 2 has, as shown in FIG. 11(a), a positioning member 13 for the image display device 1, the image display device 1 and the optical system P can be assembled together extremely accurately and easily. As shown in FIG. 11(b), the image display device-side surface 2 may have a positioning member 13 integrated with the optical system P. If the positioning member 13, which is used when the image display device-side surface 2 and the display surface are bonded together, is integrated with the optical system P, the number of components and the number of manhours reduce, and no assembling error arises. Accordingly, it becomes possible to assemble the components extremely accurately and easily.

As shown in FIGS. 11(c) and 11(d), the positioning member 13 desirably has a configuration in which the positioning member 13 contacts the image display device 1 at side surfaces of the image display device 1 and at least two points on the optical system-side surface of the image display device 1. Such an arrangement enables an adhesive 14 to be injected into a space (hatched portion) between the contact point on each side surface of the image display device 1 and a contact point on the optical system-side surface of the image display device 1 to bond the image display device 1 to the image display device-side surface 2. Therefore, the image display device 1 and the optical system P can be assembled together extremely accurately and easily without the likelihood of the adhesive 14 or dust entering the space between the image display device 1 and the image display device-side surface 2.

Assuming that the angle formed between an observer's visual axis lying when the observer sees forward and a light ray emanating from the center of the image display device 1 and reaching the pupil center is β (a counterclockwise direction relative to the visual axis is defined as a positive direction), it is desirable that the direction for diopter adjustment should be a direction that satisfies the following condition:

$$45° \leq \beta \leq 120° \quad (21)$$

In the prism optical system P, if the direction of the optical axis at the final surface is in the range of from 45° to 120° with respect to the observer's visual axis, the direction for diopter adjustment is a direction in which the image display device 1 does not interfere with the observer's face. Therefore, it becomes possible to increase the amount to which diopter adjustment can be made.

It is even more desirable that the direction for diopter adjustment should be a direction that satisfies the following condition:

$$45° \leq \beta \leq 80° \quad (22)$$

In the prism optical system P, if the direction of the optical axis at the final surface is in the range of from 45° to 80° with respect to the observer's visual axis, because the direction for diopter adjustment is the direction of the optical axis at the final surface, even when the display surface of the image display device 1 moves in the direction of the optical axis at the final surface to effect diopter adjustment, the amount to which the optical system projects in the direction of the observer's visual axis is small, and the apparatus is easy to handle.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3 is a sectional view of an arrangement in which a visual field limiting device is provided.

FIGS. 4(a), 4(b) and 4(c) show the relationship between a see-through image range and an image display area.

DESCRIPTION OF THE PREFERRED EMBODIMENTS

Examples 1 to 6 of the optical system of the head- or face-mounted image display apparatus according to the present invention will be described below.

[Example 11]

Figure 12:
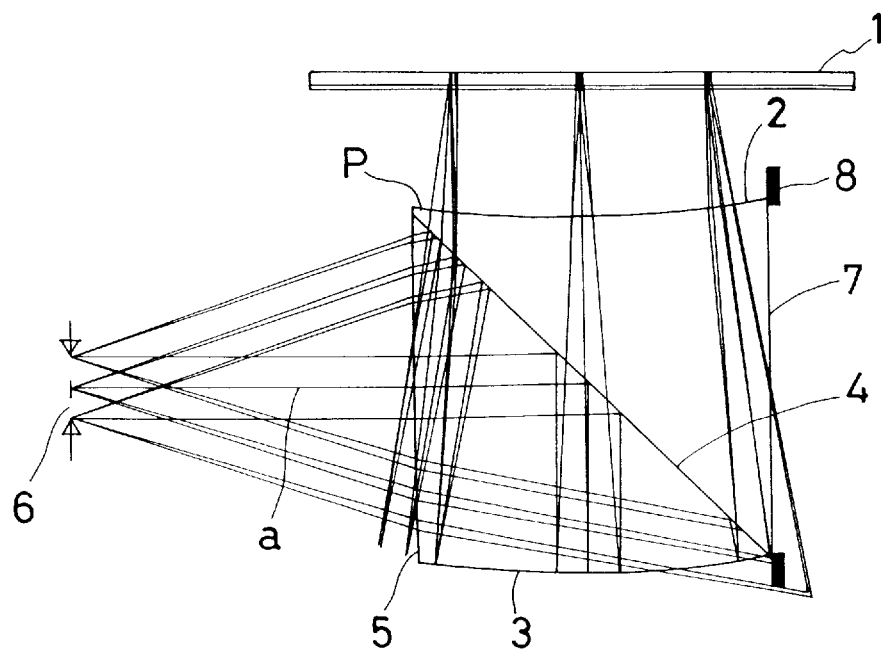
FIG. 12 is a sectional view of an optical system according to Example 1.

As shown in the sectional view of FIG. 12, the optical system according to this example is a head- or face-mounted image display apparatus using a prism optical system P. Light rays from an image display device 1 enter the prism optical system P through an image display device-side surface 2 of the optical system P, and pass through a semitransparent film 4. After being reflected by a back-coated mirror 3, the light rays are reflected by the semitransparent film 4, and come out of the prism optical system P through a pupil-side exit surface 5 of the optical system P to enter an observer's pupil 6. During the use of see-through function, light rays from an external scene enter the prism optical system P through a transmitting surface 7 facing opposite to the exit surface 5, which is closer to the observer's eyeball. The incident light rays pass through the semitransparent film 4 and the exit surface 5 to come out of the prism optical system P and enter the observer's pupil 6. In addition, a mask 8 is provided at the entrance side of the transmitting surface 7 as a device for limiting the visual field during the see-through observation.

Figure 13A:
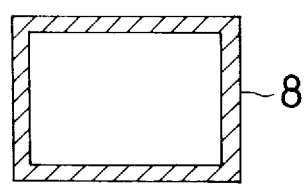
FIGS. 13(a), 13(b) and 13(c) show mask configurations.
Figure 13B:
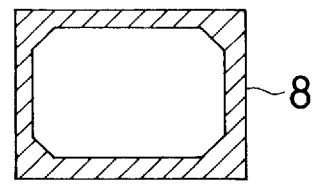
Figure 13C:
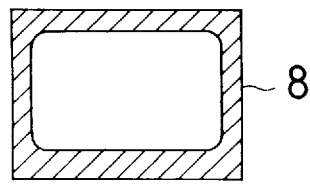

The mask 8 may have a configuration such as those shown in FIGS. 13(a), 13(b) and 13(c): a mask having a quadrangular aperture [see FIG. 13(a)]; a mask having a quadrangular aperture chamfered at four corners thereof [see FIG. 13(b)]; and a mask having a quadrangular aperture rounded at four corners thereof [see FIG. 13(c)]. The mask 8 has a thickness of several tens of micrometers to 1 millimeter, and it may be formed by coating a black antireflective paint on a black light-blocking polyester sheet or metal sheet.

Numerical data in this example will be shown later. Surface Nos. are shown as ordinal numbers in backward ray tracing from the observer's pupil position 6 toward the image display device 1. Surface separation is shown as a distance from an intersection between a surface and an optical axis to an intersection between the subsequent surface and the optical axis along an axial principal ray (optical axis). Tilt angle is shown as an angle formed between a straight line passing through an intersection between a surface and an optical axis at right angles to the optical axis and a tangent touching the surface at the intersection between the surface and the optical axis. The tilt angle is shown to be negative if the slope of the tangent touching the surface at the intersection between the surface and the optical axis is in a clockwise direction from the straight line, which passes through the intersection between the surface and the optical axis at right angles to the optical axis. If the slope of the tangent is in a counterclockwise direction, the tilt angle is shown to be positive. The sign of the radius of curvature of a surface is positive if the center of curvature lies at the back of the surface. If the center of curvature lies forward of the surface, the sign of the curvature radius is negative. It should be noted that the refractive index of a medium between surfaces is expressed by the refractive index for the spectral d-line. Lengths are given in millimeters (mm).

The aspherical configuration of a surface may be expressed by $$Z = [(h^2/R)/[1 + \{1 - (1+K)(h^2/R^2)\}^{1/2}] + Ah^4 + Bh^6 + Ch^8$$

where R is a paraxial curvature; K is a conical coefficient; A, B and C are 4th-, 6th- and 8th-order aspherical coefficients, respectively; and h is a distance in a direction perpendicular to the central axis of the surface.

Numerical data (A), shown later, is data during observation of an image displayed on the image display device 1.

Numerical data (B), shown later, is data during the use of see-through function.

In this example:

| | |
|---|---|
| Size of image display device 1: | 16.8 mm × 29.9 mm |
| Field angle: | 60.2° × 34.9° |
| | (60.2° × 33.5° |
| | at subordinate rays) |
| $\theta min/\theta max$: | 0.87 |
| | (at subordinate rays) |
| h: | 11.5 mm |
| $\alpha$: | 19.9° |

Figure 1:
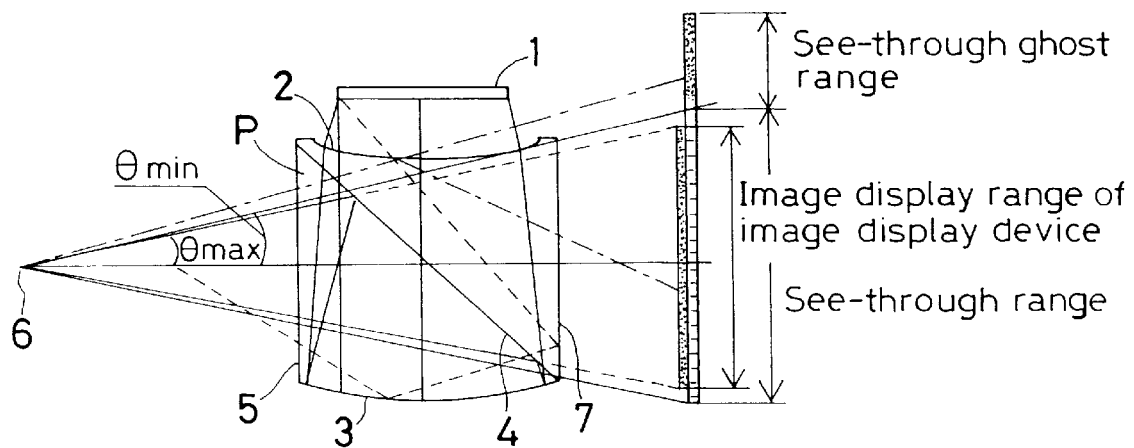
FIG. 1 is a sectional view showing a basic form of the head- or ace-mounted image display apparatus according to the present invention.
Figures 2A, 2B, 2C:
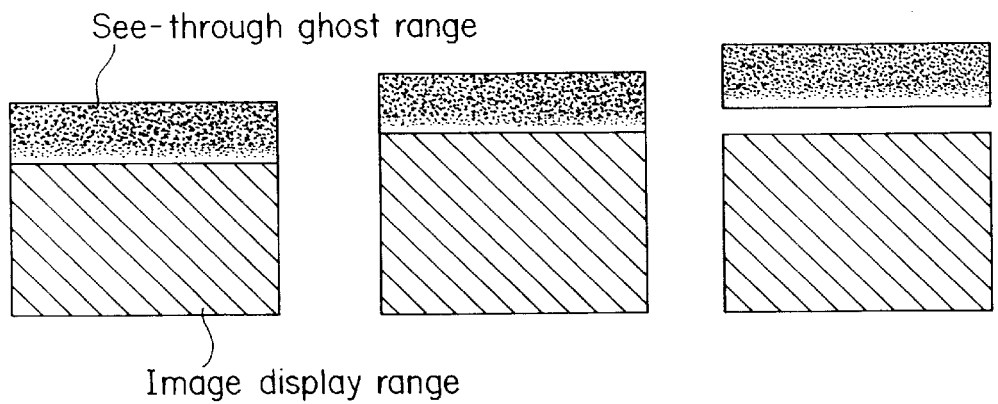
FIGS. 2(a), 2(b) and 2(c) show the relationship between a see-through ghost range and an image display area.
Figure 5A:
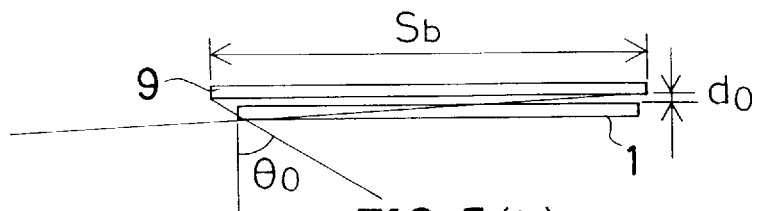
FIGS. 5(a), 5(b) and 5(c) show the way in which unwanted light is reduced by separating an illuminating device and an image display device.
Figure 5B:
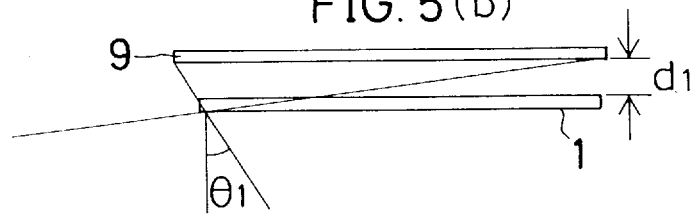
Figure 5C:
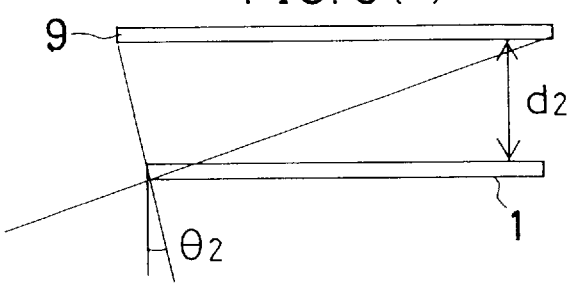
Figure 6A:
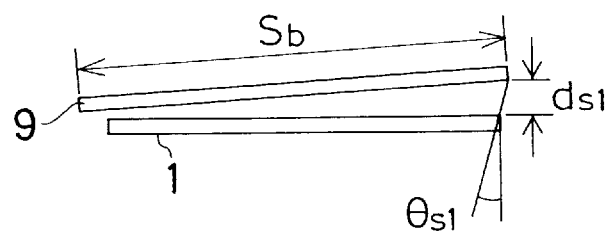
FIGS. 6(a) and 6(b) show the way in which unwanted light is reduced by tilting an illuminating device and an image display device such that these two devices diverge from each other at ends thereof which are remote from an observer's eyeball.
Figure 6B:
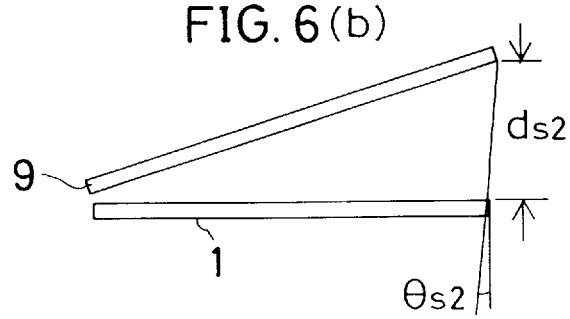
Figure 7:
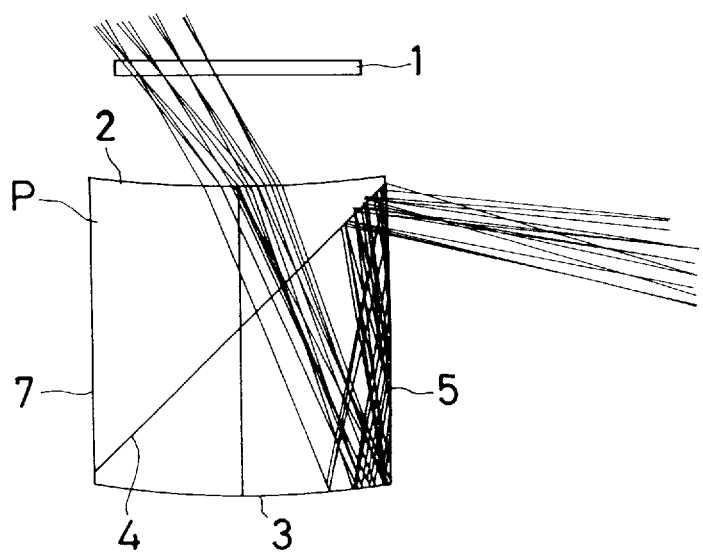
FIG. 7 is a sectional view showing unwanted light that can be reduced by the arrangement shown in FIGS. 6(a) and 6(b).
Figure 8A:
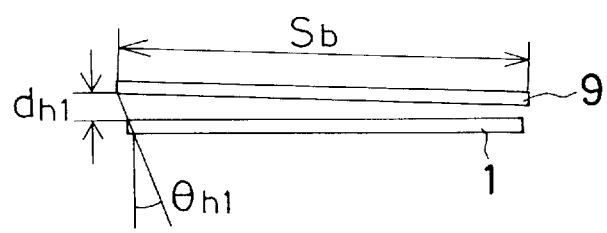
FIGS. 8(a) and 8(b) show the way in which unwanted light is reduced by tilting an illuminating device and an image display device such that these two devices diverge from each other at ends thereof which are closer to an observer's eyeball.
Figure 8B:
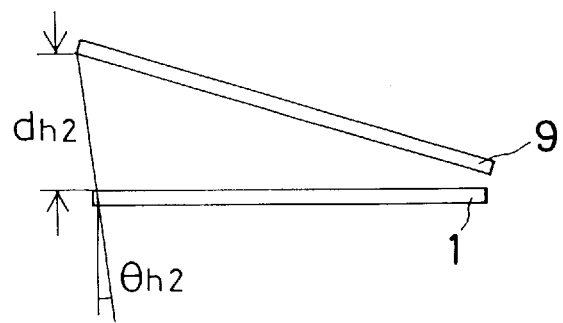
Figure 9:
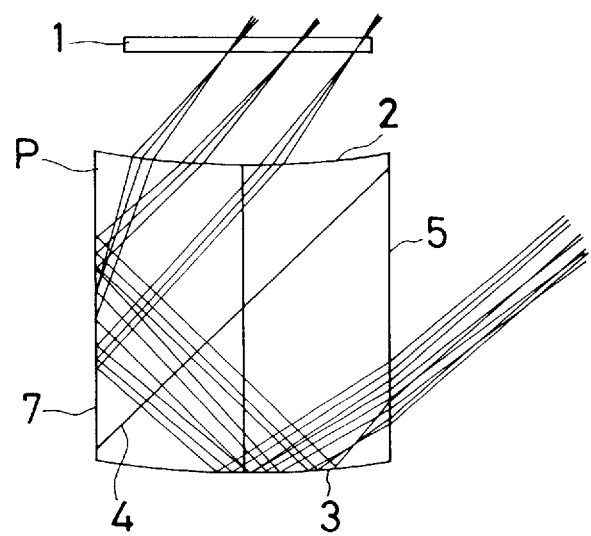
FIG. 9 is a sectional view showing unwanted light that can be reduced by the arrangement shown in FIGS. 8(a) and 8(b).
Figure 10A:
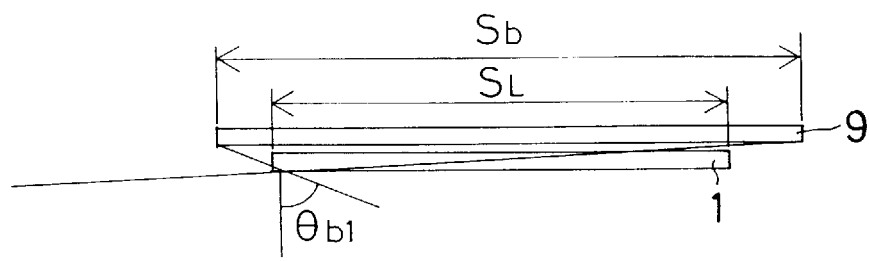
FIGS. 10(a) to 10(e) are sectional views for explaining other unwanted light reducing devices usable in a head- or face-mounted image display apparatus according to a third aspect of the present invention.
Figure 10B:
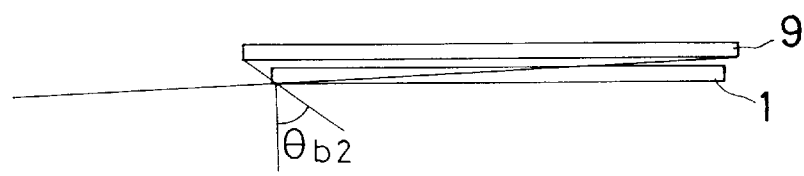
Figure 10C:
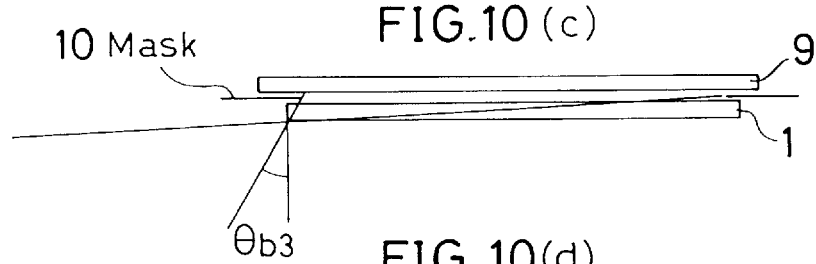
Figure 10D:
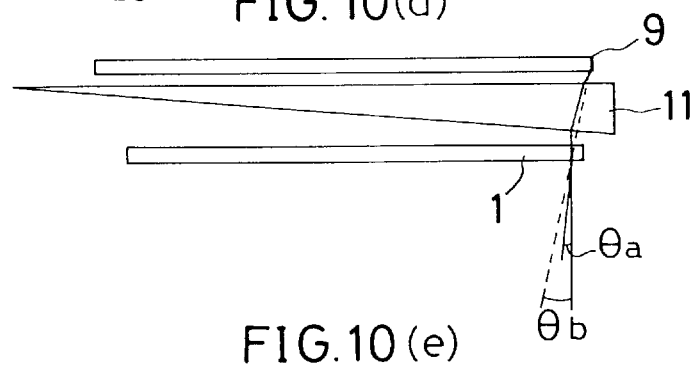
Figure 10E:
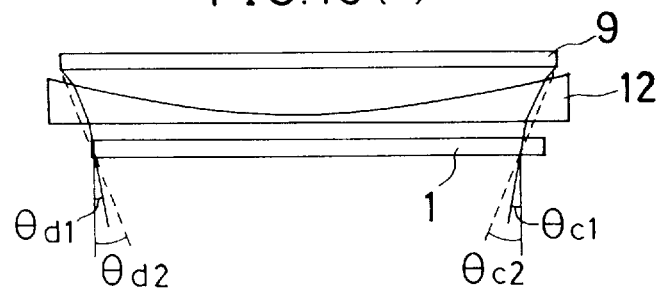
Figure 11A:
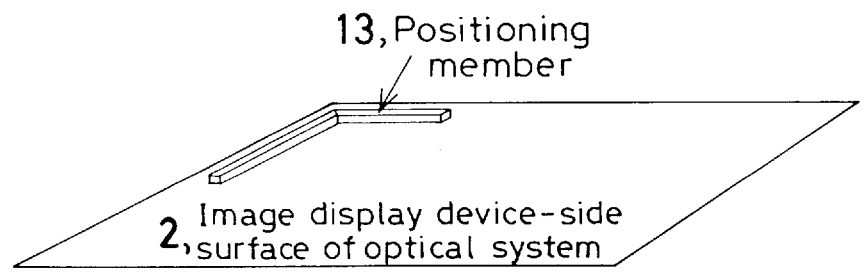
FIGS. 11(a) to 11(d) show the way in which a prism optical system and an image display device are bonded together.
Figure 11B:
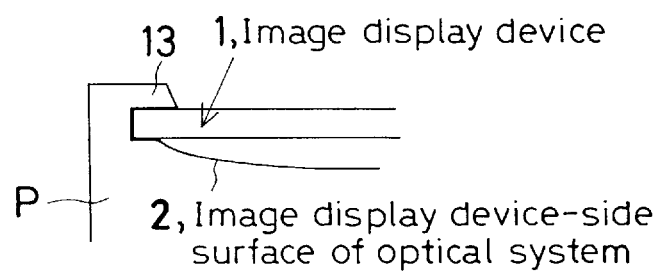
Figure 11C:
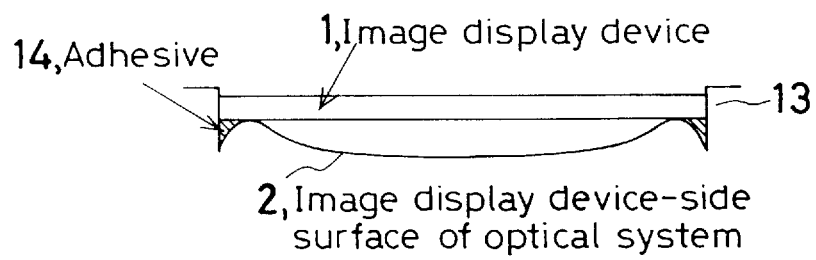
Figure 11D:
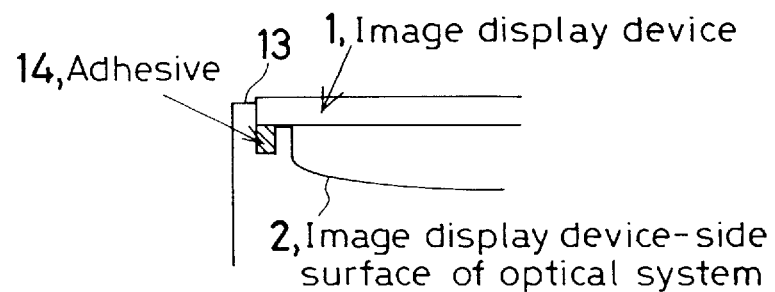

This optical system satisfies the condition (1) and therefore provides the observer with an image such as that shown in FIG. 2(a). Further, h=11.5 satisfies the condition (4). Accordingly, the observer is provided with an image such as that shown in FIG. 4(a).

Moreover, because the slope of the image display device-side surface 2 at a point where the outermost extra-axial principal ray passes satisfies the condition of $15° \leq \alpha \leq 25°$, astigmatism and distortion, together with the tilt angle of principal rays to the image display device 1, are corrected with good balance.

[Example 2]

Figure 14:
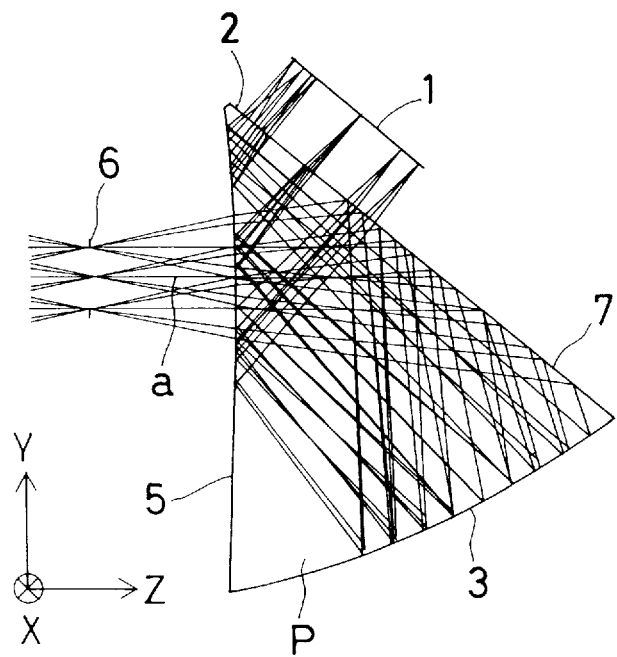
FIG. 14 is a sectional view of an optical system according to Example 2.

As shown in the sectional view of FIG. 14, the optical system according to this example is a head- or face-mounted image display apparatus using a prism optical system P. Light rays from an image display device 1 enter the prism optical system P through an image display device-side surface 2 of the optical system P, and are totally reflected by a pupil-side exit surface 5 of the prism optical system P. Then, the reflected light rays are reflected by a back-coated mirror 3 and further reflected by a transmitting surface 7 facing opposite to the exit surface 5. Thereafter, the reflected light rays come out of the prism optical system P through the pupil-side exit surface 5 of the optical system P, and enter an observer's pupil 6. During the use of see-through function, light rays from an external scene enter the prism optical system P through the transmitting surface 7, which faces opposite to the observer's eyeball-side exit surface 5. The incident light rays come out of the prism optical system P through the exit surface 5, and enter the observer's pupil 6.

Numerical data in this example will be shown later. Surface Nos. are shown as ordinal numbers in backward ray tracing from the observer's pupil position 6 toward the image display device 1. A coordinate system is defined as shown in FIG. 14: With the observer's pupil position 6 defined as an origin, the direction of an observer's visual axis a is taken as a Z-axis, where a direction extending from the origin toward the prism optical system P is defined as a positive direction. A vertical direction (as viewed from the observer's eyeball) perpendicularly intersecting the observer's visual axis a is taken as a Y-axis, where the upward direction is defined as a positive direction. A horizontal direction (as viewed from the observer's eyeball) perpendicularly intersecting the observer's visual axis a is taken as an X-axis, where the leftward direction is defined as a positive direction. In other words, the plane of the figure is defined as a YZ-plane, and a plane perpendicular to the plane of the figure is defined as an XZ-plane. Further, it is assumed that the optical axis is bent in the YZ-plane, which is parallel to the plane of the figure.

In constituent parameters (shown later), surface separation given with regard to the surface No. 2 is a distance from the surface No. 1 along the Z-axis, and this position is defined as a reference point for each of the surface No. 2 and surfaces following it. For each of the surfaces following the surface No. 1, eccentricities Y and Z and tilt angle e are shown. The eccentricity Y is a distance by which the vertex of the surface decenters in the Y-axis direction from the reference point. The eccentricity Z is a distance by which the vertex of the surface decenters in the Z-axis direction from the reference point. The tilt angle $\theta$ is the tilt angle of the central axis of the surface from the Z-axis. In this case, positive $\theta$ means counterclockwise rotation. Eccentricities Y and Z and tilt angle $\theta$ are also shown for the image display device 1. In the case of the image display device 1, the eccentricity Y is a distance by which the center of the image display device 1 decenters in the Y-axis direction from the surface No. 1 (observer's pupil position 6). The eccentricity Z is a distance by which the center of the image display device 1 decenters in the Z-axis direction from the surface No. 1. The tilt angle $\theta$ is the tilt angle of a line normal to the image display device 1 from the Z-axis. It should be noted that surface separation is shown with the direction of backward tracing along the optical axis defined as a positive direction.

The non-rotationally symmetric aspherical configuration of each surface may be expressed in the coordinate system defining the surface as follows:

$$Z = [(X^2/R_x) + (Y^2/R_y)]/[1 + \{1 - (1 + K_x)(X^2/R_x^2) - (1 + K_y)(Y^2/R_y^2)\}^{1/2}] + AR[(1 - AP)X^2 + (1 + AP)Y^2]^2 + BR[(1 - BP)X^2 + (1 + BP)Y^2]^3$$

where $R_y$ is the paraxial curvature radius of the surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

It should be noted that the refractive index of a medium between surfaces is expressed by the refractive index for the spectral d-line. Lengths are given in millimeters (mm).

In this example:

| Size of image display device 1: | 19.11 mm × 25.48 mm (1.3 inches) |
|---|---|
| Field angle: | 30.0° × 22.72° |

In this example, the image display device-side surface 2 and the display surface of the image display device 1 are kept parallel to each other. Therefore, the assembling operation can be carried out by using the image display device-side surface 2 as the reference. Thus, the assembling operation is facilitated, and it is possible to provide a head- or face-mounted image display apparatus with minimal assembling errors.

[Example 3]

Figure 15:
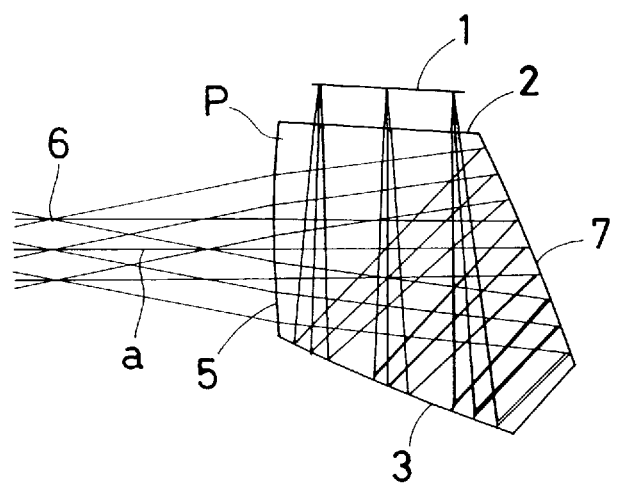
FIG. 15 is a sectional view of an optical system according to Example 3.

As shown in the sectional view of FIG. 15, the optical system according to this example is a head- or face-mounted image display apparatus using a prism optical system P. Light rays from an image display device 1 enter the prism optical system P through an image display device-side surface 2 of the optical system P, and are reflected by a back-coated mirror 3. Then, the reflected light rays are reflected by a transmitting surface 7 facing opposite to a pupil-side exit surface 5 of the prism optical system P. Thereafter, the reflected light rays come out of the prism optical system P through the pupil-side exit surface 5, and enter an observer's pupil 6. During the use of see-through function, light rays from an external scene enter the prism optical system P through the transmitting surface 7, which faces opposite to the observer's eyeball-side exit surface 5. The incident light rays come out of the prism optical system P through the exit surface 5, and enter the observer's pupil 6.

Numerical data in this example will be shown later. Surface Nos. are shown as ordinal numbers in backward ray tracing from the observer's pupil position 6 toward the image display device 1. Surface separation is shown as a distance from an intersection between a surface and an optical axis to an intersection between the subsequent surface and the optical axis along an axial principal ray (optical axis). Tilt angle is shown as an angle formed between a straight line passing through an intersection between a surface and an optical axis at right angles to the optical axis and a tangent touching the surface at the intersection between the surface and the optical axis. The tilt angle is shown to be negative if the slope of the tangent touching the surface at the intersection between the surface and the optical axis is in a clockwise direction from the straight line, which passes through the intersection between the surface and the optical axis at right angles to the optical axis. If the slope of the tangent is in a counterclockwise direction, the tilt angle is shown to be positive. The sign of the radius of curvature of a surface is positive if the center of curvature lies at the back of the surface. If the center of curvature lies forward of the surface, the sign of the curvature radius is negative. It should be noted that the refractive index of a medium between surfaces is expressed by the refractive index for the spectral d-line. Lengths are given in millimeters (mm).

The surface No. 4 is an anamorphic surface which is expressed by $R_y$ and $R_x$ in a coordinate system similar to that in FIG. 14. $R_y$ is the paraxial radius of curvature in the YZ-plane (the plane of the figure), and $R_x$ is the paraxial radius of curvature in the XZ-plane.

In this example:

| Size of image display device 1: | 19.11 mm × 25.48 mm (1.3 inches) |
|---|---|
| Field angle: | 30.0° × 22.72° |

In this example, the image display device-side surface 2 and the display surface of the image display device 1 are kept parallel to each other.

[Example 4]

Figure 16:
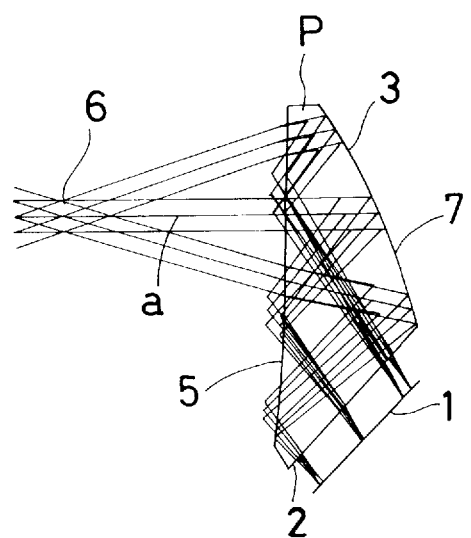
FIG. 16 is a sectional view of an optical system according to Example 4.

As shown in the sectional view of FIG. 16, the optical system according to this example is a head- or face-mounted image display apparatus using a prism optical system P. Light rays from an image display device 1 enter the prism optical system P through an image display device-side surface 2 of the optical system P, and are totally reflected by a pupil-side exit surface 5 of the prism optical system P. Thereafter, the reflected light rays are reflected by a back-coated mirror 3 serving also as a transmitting surface 7, and come out of the prism optical system P through the pupil-side exit surface 5 to enter an observer's pupil 6. During the use of see-through function, light rays from an external scene enter the prism optical system P through the transmitting surface 7, which faces opposite to the observer's eyeball-side exit surface 5. The incident light rays come out of the prism optical system P through the exit surface 5, and enter the observer's pupil 6.

Numerical data in this example will be shown later. The way of taking the data is the same as in Example 2.

In this example:

| Size of image display device 1: | 19.11 mm × 25.48 mm (1.3 inches) |
|---|---|
| Field angle: | 57.82° × 34.52° |

In this example, the image display device-side surface 2 and the display surface of the image display device 1 are kept parallel to each other.

[Example 5]

Figure 17:
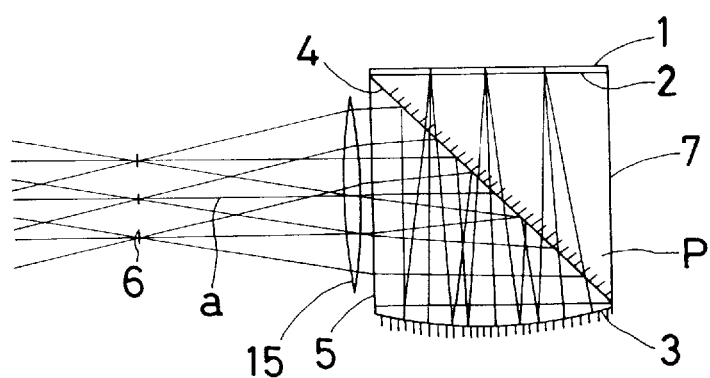
FIG. 17 is a sectional view of an optical system according to Example 5.

As shown in the sectional view of FIG. 17, the optical system according to this example is a head- or face-mounted image display apparatus comprising a prism optical system P and a convex lens 15. The prism optical system P is arranged such that an exit surface 5 and a transmitting surface 7 are parallel to each other, and an image display device-side surface 2 is perpendicular to both the exit surface 5 and the transmitting surface 7, and that a semitransparent film 4 is disposed at 45° to the three surfaces. The convex lens 15 is disposed between the exit surface 5 and an observer's pupil 6. Light rays from an image display device 1 enter the prism optical system P through the image display device-side surface 2, and pass through the semitransparent film 4. After being reflected by a back-coated mirror 3, the light rays are reflected by the semitransparent film 4, and come out of the prism optical system P through the pupil-side exit surface 5 of the optical system P. Then, the light rays pass through the convex lens 15 to enter the observer's pupil 6. During the use of see-through function, light rays from an external scene enter the prism optical system P through the transmitting surface 7 and pass through the semitransparent film 4 and the exit surface 5 to come out of the prism optical system P and enter the observer's pupil 6 through the convex lens 15.

Presentation of numerical data in this example is omitted.

In this example:

| Size of image display device 1: | 10.91 mm × 14.55 mm (0.75 inches) |
|---|---|
| Field angle: | 30.0°× 22.5° |

In this example, the image display device-side surface 2 and the display surface of the image display device 1 are bonded together. Therefore, assembling errors are unlikely to arise, and the apparatus can be readily assembled.

[Example 6]

Figure 18:
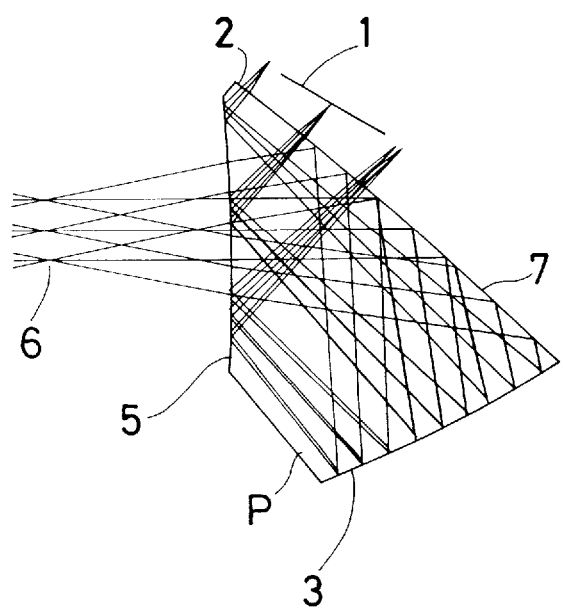
FIG. 18 is a sectional view of an optical system according to Example 6.

As shown in the sectional view of FIG. 18, the optical system according to this example is a head- or face-mounted image display apparatus using a prism optical system P. Light rays from an image display device 1 enter the prism optical system P through an image display device-side surface 2 of the optical system P, and are totally reflected by a pupil-side exit surface 5 of the prism optical system P. Then, the reflected light rays are reflected by a back-coated mirror 3 and further reflected by a transmitting surface 7 facing opposite to the exit surface 5. Thereafter, the reflected light rays come out of the prism optical system P through the pupil-side exit surface 5 of the optical system P, and enter an observer's pupil 6. During the use of see-through function, light rays from an external scene enter the prism optical system P through the transmitting surface 7, which faces opposite to the observer's eyeball-side exit surface 5. The incident light rays come out of the prism optical system P through the exit surface 5, and enter the observer's pupil 6.

Numerical data in this example will be shown later. The way of taking the data is the same as in Example 2.

In this example:

| Size of image display device 1: | 19.11 mm × 25.48 mm (1.3 inches) |
|---|---|
| Field angle: | 30.0°× 22.72° |
| β (direction for diopter adjustment) | 58.43° |

In this example, the direction for diopter adjustment is 58.43°, which satisfies the condition of $45° \leq \alpha \leq 80°$. Accordingly, diopter adjustment can be effected without causing the image display device 1 to interfere with the observer's face, and it is possible to provide a compact head- or face-mounted image display apparatus.

Numerical data in the above-described Examples 1 to 4 and 6 will be shown below.

EXAMPLE 1 (A)

| Surface No. | Radius of curvature | Surface separation | Refractive index | Abbe's No. | Tilt angle |
|---|---|---|---|---|---|
| 1 | ∞ (pupil) | 23.00 | | | |
| 2 | ∞ | 11.25 | 1.52540 | 56.26 | |
| 3 | ∞ (reflecting surface) | −12.75 | 1.52540 | 56.26 | 45.0° |
| 4 | 77.2112 (reflecting surface) | 23.75 | 1.52540 | 56.26 | |
| 5 | 681.3345 K 0.0000 A 4.7647 × 10$^{-5}$ B −9.9862 × 10$^{-8}$ C 9.7000 × 10$^{-11}$ | 8.46 | | | |
| 6 | ∞ | 1.02 | 1.51633 | 64.15 | |
| 7 | ∞ (display device) | | | | |

EXAMPLE 1 (B)

| Surface No. | Radius of curvature | Surface separation | Refractive index | Abbe's No. | Tilt angle |
|---|---|---|---|---|---|
| 1 | ∞ (pupil) | 23.00 | | | |
| 2 | ∞ | 22.50 | 1.52540 | 56.26 | |
| 3 | ∞ | 0.00 | | | |
| 4 | ∞ (mask) | ∞ | | | |
| 5 | (external scene) | | | | |

EXAMPLE 2

| Surface No. | Radius of curvature | Surface separation (Eccentricity) | Refractive index | Abbe's No. (Tilt angle) |
|---|---|---|---|---|
| 1 | ∞ (pupil) | 19.003 | | |
| 2 | $R_y$ 869.459 $R_x$ 499.872 $K_y$ 0.000000 $K_x$ 0.000000 AR −0.191873 × 10$^{-7}$ BR 0.193379 × 10$^{-10}$ AP 0.214080 × 10$^1$ BP −0.162968 | Y −56.188 Z 0.000 | 1.48700 | 70.40 θ −0.723° |
| 3 | ∞ | Y 24.825 Z −1.934 | 1.48700 | 70.40 θ 50.699° |
| 4 | $R_y$ 122.586 $R_x$ 170.296 $K_y$ 0.103169 $K_x$ 0.177461 AR −0.191351 × 10$^{-7}$ BR −0.178507 × 10$^{-11}$ AP −0.687723 BP 0.556786 | Y −44.242 Z −22.410 | 1.48700 | 70.40 θ 91.378° |
| 5 | $R_y$ 869.459 $R_x$ 499.872 $K_y$ 0.000000 $K_x$ 0.000000 AR −0.191873 × 10$^{-7}$ BR 0.193379 × 10$^{-10}$ AP 0.214080 × 10$^1$ BP −0.162968 | Y −56.188 Z 0.000 | 1.48700 | 70.40 θ −0.723° |
| 6 | ∞ | Y 24.825 Z −1.934 | | θ 50.699° |
| 7 | ∞ (display device) | Y 21.756 Z 36.506 | | θ 50.699° |

EXAMPLE 3

| Surface No. | Radius of curvature | Surface separation | Refractive index | Abbe's No. | Tilt angle |
|---|---|---|---|---|---|
| 1 | ∞ (pupil) | 30.00 | | | |
| 2 | 188.3721 | 34.00 | 1.49241 | 57.70 | |
| 3 | −243.9321 (reflecting surface) | −26.00 | 1.49241 | 57.70 | 22.5° |
| 4 | $R_y$ 287.7972 $R_x$ 188.5238 (reflecting surface) | 34.00 | 1.49241 | 57.70 | 22.5° |
| 5 | ∞ | 5.44 | | | −3.5° |
| 6 | ∞ (display device) | | | | −3.5° |

EXAMPLE 4

| Surface No. | Radius of curvature | Surface separation | Refractive index (Eccentricity) | Abbe's No. (Tilt angle) |
|---|---|---|---|---|
| 1 | ∞ (pupil) | 26.451 | | |
| 2 | $R_y$ −427.463 | | 1.49216 | 57.50 |
|   | $R_x$ −57.226 | | Y −41.788 | θ −7.000° |
|   | $K_y$ 20.000000 | | Z 0.000 | |
|   | $K_x$ −3.245753 | | | |
|   | AR 0.403204 × $10^{-6}$ | | | |
|   | BR −0.526817 × $10^{-10}$ | | | |
|   | AP −0.235050 | | | |
|   | BP −0.234999 | | | |
| 3 | $R_y$ −75.807 | | 1.49216 | 57.50 |
|   | $R_x$ −48.700 | | Y 32.255 | θ 50.185° |
|   | $R_y$ −1.589247 | | Z −7.294 | |
|   | $K_x$ −1.168760 | | | |
|   | AR −0.249700 × $10^{-8}$ | | | |
|   | BR −0.133229 × $10^{-9}$ | | | |
|   | AP 0.370827 × $10^{1}$ | | | |
|   | BP −0.207493 | | | |
| 4 | $R_y$ −427.463 | | 1.49216 | 57.50 |
|   | $R_x$ −57.226 | | Y −41.788 | θ −7.000° |
|   | $K_y$ 20.000000 | | Z 0.000 | |
|   | $K_x$ −3.245753 | | | |
|   | AR 0.403204 × $10^{-6}$ | | | |
|   | BR −0.526817 × $10^{-10}$ | | | |
|   | AP −0.235050 | | | |
|   | BP −0.234999 | | | |
| 5 | ∞ | | Y −34.343 | θ −49.016° |
|   | | | Z 0.000 | |
| 6 | ∞ (display device) | | Y −29.936 | θ −49.016° |
|   | | | Z 39.790 | |

EXAMPLE 6

| Surface No. | Radius of curvature | Surface separation | Refractive index (Eccentricity) | Abbe's No. (Tilt angle) |
|---|---|---|---|---|
| 1 | ∞ (pupil) | 24.480 | | |
| 2 | $R_y$ −736.361 | | 1.48700 | 70.40 |
|   | $R_x$ −505.846 | | Y −21.744 | θ −2.450° |
|   | $K_y$ 0.000000 | | Z 0.000 | |
|   | $K_x$ 0.000000 | | | |
|   | AR −0.306697 × $10^{-7}$ | | | |
|   | BR 0.809687 × $10^{-10}$ | | | |
|   | AP 0.263980 × $10^{1}$ | | | |
|   | BP 0.574278 × $10^{-1}$ | | | |
| 3 | −553.259 | | 1.48700 | 70.40 |
|   | | | Y 23.482 | θ 53.267° |
|   | | | Z −4.568 | |
| 4 | $R_y$ 146.168 | | 1.48700 | 70.40 |
|   | $R_x$ 128.931 | | Y −42.800 | θ 93.371° |
|   | $K_y$ −0.067710 | | Z −31.014 | |
|   | $K_x$ −0.407545 | | | |
|   | AR 0.550524 × $10^{-8}$ | | | |
|   | BR −0.151433 × $10^{-11}$ | | | |
|   | AP −0.155988 × $10^{1}$ | | | |
|   | BP 0.437690 | | | |
| 5 | $R_y$ −736.361 | | 1.48700 | 70.40 |
|   | $R_x$ −505.846 | | Y −21.744 | θ −2.450° |
|   | $K_y$ 0.000000 | | Z 0.000 | |
|   | $K_x$ 0.000000 | | | |
|   | AR −0.306697 × $10^{-7}$ | | | |
|   | BR 0.809687 × $10^{-10}$ | | | |
|   | AP 0.263980 × $10^{1}$ | | | |
|   | BP 0.574278 × $10^{-1}$ | | | |
| 6 | −553.259 | | Y 23.482 | θ 53.267° |
|   | | | Z −4.568 | |
| 7 | ∞ (display device) | | Y 16.438 | θ 58.428° |
|   | | | Z 39.101 | |

Figure 19:
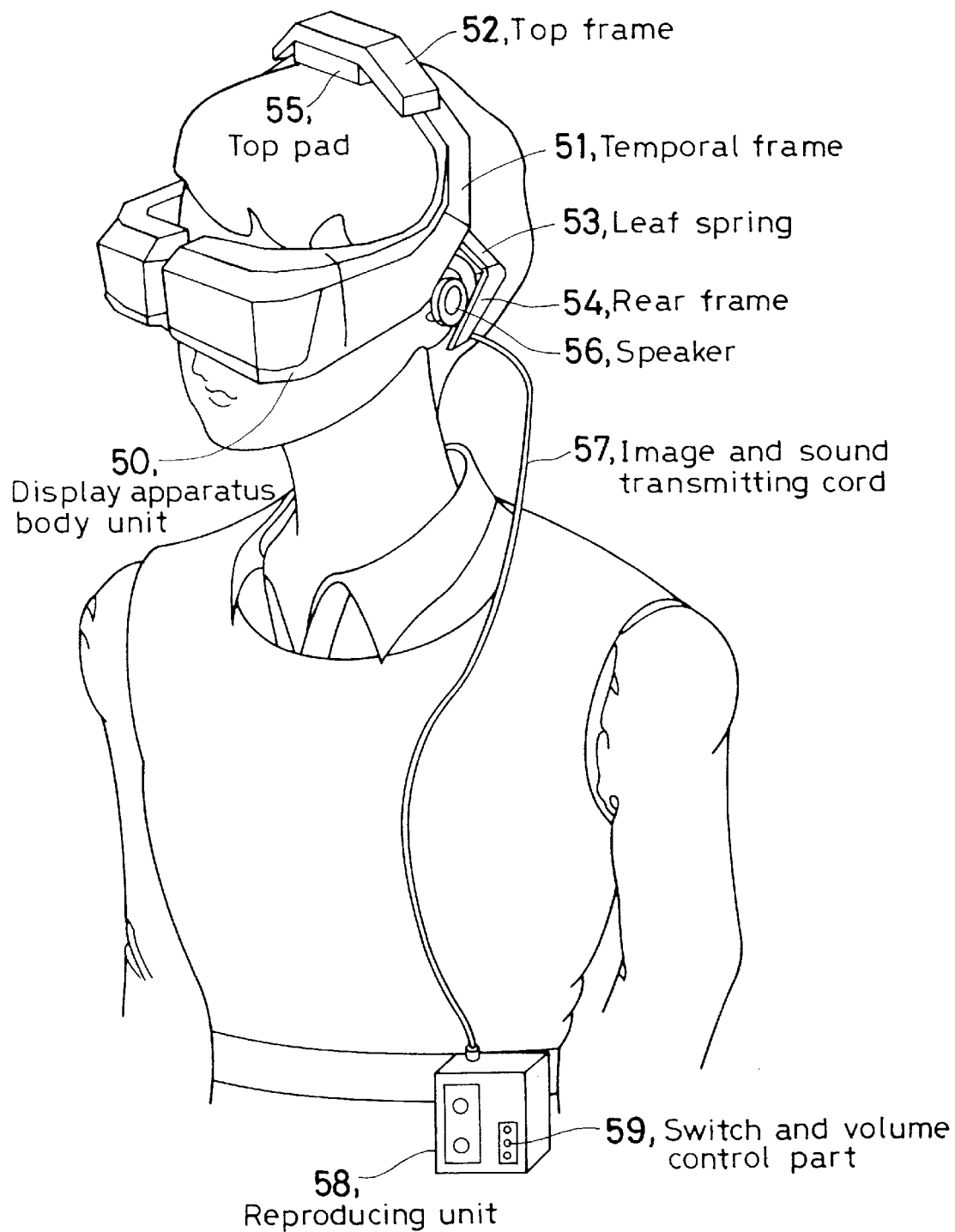
FIG. 19 shows the whole arrangement of one example of a portable image display apparatus.

It is possible to form a portable image display apparatus such as a stationary or head-mounted image display apparatus, which enables the observer to see with both eyes by preparing a pair of combinations of an optical system as shown in the above-described examples and an image display device for the left and right eyes, and supporting them apart from each other by the distance between the eyes. FIG. 19 shows the whole arrangement of an example of such a portable image display apparatus. A display apparatus body unit 50 contains a pair of left and right optical systems such as those described above, and image display devices comprising liquid crystal display devices (LCDs) are disposed at the respective image planes of the two optical systems. The apparatus body unit 50 is provided with a pair of left and right temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears like the temples of a pair of glasses and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his or her head without feeling uncomfortable.

Further, a speaker 56 is provided on each rear frame 54 to enable the user to enjoy listening to stereophonic sound in addition to image observation. The display apparatus body unit 50 having the speakers 56 is connected with a reproducing unit 58, e.g. a portable video cassette unit, through an image and sound transmitting cord 57. Therefore, the user can enjoy not only observing an image but also listening to sound with the reproducing unit 58 retained on a desired position, e.g. a belt, as illustrated in the figure. Reference numeral 59 in the figure denotes a switch and volume control part of the reproducing unit 58. It should be noted that the top frame 52 contains electronic parts such as image and sound processing circuits.

The cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 57 may be connected to a computer to receive computer graphic images or message images or the like from the computer. To eliminate the bothersome cord, the image display apparatus may be arranged to receive external radio signals through an antenna connected thereto.

Although the principle and some examples of the head-or face-mounted image display apparatus according to the present invention have been described above, it should be noted that the present invention is not necessarily limited to the foregoing examples but can be modified in a variety of ways.

As has been described above, it is possible according to the present invention to provide a head- or face-mounted image display apparatus which has a compact structure, wide field angle, high resolution, minimal distortion and astigmatism as well as a small principal ray tilt angle and which provides favorable visibility and is inexpensive and easy to handle by reducing unwanted light without using a polarizing member or a louver optical system.

What we claim is:

1. A head- or face-mounted image display apparatus comprising an image display device for displaying an image;

an optical system for projecting said image into an observer's eyeball as an enlarged image without effecting image formation on the way to said observer's eyeball; and means for mounting and retaining said image display device and said optical system on an observer's head or face;

said optical system being a prism optical system having at least four surfaces, including a back-coated mirror of positive power which is disposed to face said image display device, an image display device-side surface facing opposite to said back-coated mirror, an exit surface disposed on a side of said observer's eyeball, and a transmitting surface facing opposite to said exit surface, said prism optical system being made of a transparent medium having a refractive index larger than 1;

wherein a distance between a vertex of said back-coated mirror and a vertex of said image display device-side surface satisfies the following condition:

$$0.8 \leq \theta_{min}/\theta_{max} \leq 1.5 \quad (1)$$

where $\theta_{min}$ is a smallest of angles formed between a central axis of a virtual image field and light rays extending from an arbitrary point in an exit pupil of said optical system and touching said image display device-side surface, and $\theta_{max}$ is an angle formed between the central axis of the virtual image field and a light ray extending from a central point in the exit pupil of said optical system to an upper edge of the virtual image field.

2. A head- or face-mounted image display apparatus according to claim 1, wherein said optical system satisfies the following condition:

$$1.0 \leq \theta_{min}/\theta_{max} \leq 1.5 \quad (2).$$

3. A head- or face-mounted image display apparatus according to claim 1, wherein said optical system satisfies the following condition:

$$1.2 \leq \theta_{min}/\theta_{max} 1.5 \quad (3).$$

4. A head- or face-mounted image display apparatus comprising an image display device for displaying an image; an optical system for projecting said image into an observer's eyeball as an enlarged image without effecting image formation on the way to said observer's eyeball; and means for mounting and retaining said image display device and said optical system on an observer's head or face;

said optical system being a prism-optical system having at least four surfaces, including a back-coated mirror of positive power which is disposed to face said image display device, an image display device-side surface facing opposite to said back-coated mirror, an exit surface disposed on a side of said observer's eyeball, and a transmitting surface facing opposite to said exit surface, said prism optical system being made of a transparent medium having a refractive index larger than 1;

said head- or face-mounted image display apparatus further comprising visual field control means for limiting a visual field at said transmitting surface, which faces opposite to said exit surface, said visual field control means having a size that satisfies the following condition:

$$h_p \geq h \geq 0.8 \times (L_{air} \tan\theta_{max} + L_{gla}\tan\theta_{max}/n) \quad (4)$$

where h is a height of said visual field control means from a central axis of a virtual image field; hp is a distance from the central axis of the virtual image field to an end surface of said prism optical system; $L_{air}$ is a distance from an exit pupil of said optical system to said exit surface; $L_{gla}$ is a distance from said exit surface to said transmitting surface; n is a refractive index of said transparent medium; and $\theta_{max}$ is an angle formed between the central axis of the virtual image field and a light ray extending from a central point in the exit pupil of said optical system to an upper edge of the virtual image field.

5. A head- or face-mounted image display apparatus according to claim 4, wherein said optical system satisfies the following condition:

$$h_p \geq h \geq 1.0 \times (L_{air}\tan\theta_{max} + L_{gla}\tan\theta_{max}/n) \quad (5).$$

6. A head- or face-mounted image display apparatus according to claim 4, wherein said optical system satisfies the following condition:

$$h_p \geq h \geq 1.4 \times (L_{air}\tan\theta_{max} + L_{gla}\tan\theta_{max}/n) \quad (6).$$

7. A head- or face-mounted image display apparatus comprising an image display device for displaying an image; illuminating means for illuminating said image display device; an optical system for projecting said image into an observer's eyeball as an enlarged image without affecting image formation on the way to said observer's eyeball; and means for mounting and retaining said image display device, said illuminating means and said optical system on an observer's head or face;

said optical system being a prism optical system having at least four surfaces, including a back-coated mirror of positive power which is disposed to face said image display device, an image display device-side surface facing opposite to said back-coated mirror, an exit surface disposed on a side of said observer's eyeball, and a transmitting surface facing opposite to said exit surface, said prism optical system being made of a transparent medium having a refractive index larger than 1;

wherein a distance between said illuminating means and said image display device satisfies the following condition:

$$Sb > d > 1 \text{ millimeter} \quad (7)$$

where d is the distance between said illuminating means and said image display device, and Sb is a [size] length of said illuminating means in a direction along the image display device.

8. A head- or face-mounted image display apparatus according to claim 7, wherein the distance between said illuminating means and said image display device satisfies the following condition:

$$Sb > d > 2 \text{ millimeters} \quad (8).$$

9. A head- or face-mounted image display apparatust according to claim 7, wherein the distance between said illuminating means and said image display device satisfies the following condition:

$$Sb > d > 3 \text{ millimeters} \quad (9).$$

10. A head- or face-mounted image display apparatus comprising an image display device for displaying an image; illuminating means for illuminating said image display device; an optical system for projecting said image into an observer's eyeball as an enlarged image without effecting image formation on the way to said observer's eyeball; and means for mounting and retaining said image display device, said illuminating means and said optical system on an observer's head or face;

said optical system being a prism optical system having at least four surfaces, including a back-coated mirror of positive power which is disposed to face said image display device, an image display device-side surface facing opposite to said back-coated mirror, an exit surface disposed on a side of said observer's eyeball, and a transmitting surface facing opposite to said exit surface, said prism optical system being made of a transparent medium having a refractive index larger than 1;

wherein said illuminating means and said image display device are tilted relative to each other.

11. A head- or face-mounted image display apparatus according to claim 10, wherein said illuminating means and said image display device are tilted relative to each other such that said illuminating means and said image display device diverge from each other at ends thereof which are remote from said observer's eyeball.

12. A head- or face-mounted image display apparatus according to claim 11, wherein said illuminating means and said image display device are tilted relative to each other such that a distance between their diverging ends, which are remote from said observer's eyeball, satisfies the following condition:

$$Sb>ds>1 \text{ millimeter} \tag{10}$$

where ds is the distance between said illuminating means and said image display device at their ends remote from said observer's eyeball, and Sb is a size of said illuminating means.

13. A head- or face-mounted image display apparatus according to claim 11, wherein said illuminating means and said image display device are tilted relative to each other such that a distance between their diverging ends, which are remote from said observer's eyeball, satisfies the following condition:

$$Sb>ds>2 \text{ millimeters} \tag{11}$$

where ds is the distance between said illuminating means and said image display device at their ends remote from said observer's eyeball, and Sb is a size of said illuminating means.

14. A head- or face-mounted image display apparatus according to claim 11, wherein said illuminating means and said image display device are tilted relative to each other such that a distance between their diverging ends, which are remote from said observer's eyeball, satisfies the following condition:

$$Sb>ds>3 \text{ millimeters} \tag{12}$$

where ds is the distance between said illuminating means and said image display device at their ends remote from said observer's eyeball, and Sb is a size of said illuminating means.

15. A head- or face-mounted image display apparatus according to claim 10, wherein said illuminating means and said image display device are tilted relative to each other such that said illuminating means and said image display device diverge from each other at ends thereof which are closer to said observer's eyeball.

16. A head- or face-mounted image display apparatus according to claim 15, wherein said illuminating means and said image display device are tilted relative to each other such that a distance between their diverging ends, which are closer to said observer's eyeball, satisfies the following condition:

$$Sb>dh>1 \text{ millimeter} \tag{13}$$

where dh is the distance between said illuminating means and said image display device at their ends closer to said observer's eyeball, and Sb is a size of said illuminating means.

17. A head- or face-mounted image display apparatus according to claim 15, wherein said illuminating means and said image display device are tilted relative to each other such that a distance between their diverging ends, which are closer to said observer's eyeball, satisfies the following condition:

$$Sb>dh>2 \text{ millimeters} \tag{14}$$

where dh is the distance between said illuminating means and said image display device at their ends closer to said observer's eyeball, and Sb is a size of said illuminating means.

18. A head- or face-mounted image display apparatus according to claim 15, wherein said illuminating means and said image display device are tilted relative to each other such that a distance between their diverging ends, which are closer to said observer's eyeball, satisfies the following condition:

$$Sb>dh>3 \text{ millimeters} \tag{15}$$

where dh is the distance between said illuminating means and said image display device at their ends closer to said observer's eyeball, and Sb is a size of said illuminating means.

19. A head- or face-mounted image display apparatus comprising an image display device for displaying an image; an optical system for projecting said image into an observer's eyeball as an enlarged image without affecting image formation on the way to said observer's eyeball; and means for mounting and retaining said image display device and said optical system on an observer's head or face;

said optical system being a prism optical system having at least four surfaces, including a back-coated mirror of positive power which is disposed to face said image display device, an image display device-side surface facing opposite to said back-coated mirror, an exit surface disposed on a side of said observer's eyeball, and a transmitting surface facing opposite to said exit surface, said prism optical system being made of a transparent medium having a refractive index larger than 1;

wherein said image display device-side surface of said optical system is a curved surface, said curved surface being tilted such that a tilt angle $\alpha$ of said surface at a point where an outermost extra-axial principal ray passes satisfies the following condition:

$$10° \leq \alpha \leq 30° \tag{19}$$

20. A head- or face-mounted image display apparatus according to claim 19, wherein said tilt angle a of said curved surface at said point satisfies the following condition:

$$15° \leq \alpha \leq 25° \tag{20}$$

21. A head- or face-mounted image display apparatus comprising an image display device for displaying an image;

an optical system for projecting said image into an observer's eyeball as an enlarged image without effecting image formation on the way to said observer's eyeball; and means for mounting and retaining said image display device and said optical system on an observer's head or face;

said optical system being a prism optical system having at least three surfaces, including a back-coated mirror of positive power which is disposed to face said image display device, an image display device-side surface facing opposite to said back-coated mirror, and an exit surface disposed on a side of said observer's eyeball, said prism optical system being made of a transparent medium having a refractive index larger than 1;

wherein said image display device-side surface and said image display device are bonded together such that an optical axis of said optical system and an optical axis of said image display device are aligned with each other.

22. A head- or face-mounted image display apparatus according to claim 21, wherein said image display device-side surface has a positioning member for said image display device.

23. A head- or face-mounted image display apparatus according to claim 22, wherein said positioning member is integrated with said optical system.

24. A head- or face-mounted image display apparatus according to claim 23, wherein said positioning member has a configuration in which said positioning member contacts said image display device at side surfaces of said image display device and at least two points on an optical system-side surface of said image display device.

25. A head- or face-mounted image display apparatus comprising an image display device for displaying an image; an optical system for projecting said image into an observer's eyeball as an enlarged image without effecting image formation on the way to said observer's eyeball; and means for mounting and retaining said image display device and said optical system on an observer's head or face;

said optical system being a prism optical system having at least four surfaces, including, a back-coated mirror of positive power which is disposed to face said image display device, an image display device-side surface facing opposite to said back-coated mirror, an exit surface disposed on a side of said observer's eyeball, and a transmitting surface facing opposite to said exit surface, said prism optical system being made of a transparent medium having a refractive index larger than 1;

wherein, assuming that an angle formed between an observer's visual axis lying when the observer sees forward and a light ray emanating from a center of said image display device and reaching a pupil center is P (a counterclockwise direction relative to the visual axis is defined as a positive direction), a direction for diopter adjustment is a direction that satisfies the following condition:

$$45° \leq \beta \leq 80° \qquad (22).$$

* * * * *